United States Patent
No et al.

(10) Patent No.: US 7,171,200 B2
(45) Date of Patent: Jan. 30, 2007

(54) METHOD AND APPARATUS FOR PROVIDING SUBSCRIBER-BASED RINGBACK TONE

(75) Inventors: Yeong Tae No, Seoul (KR); Ki Mun Kim, Incheon-si (KR); Hee Hyeck Hahm, Seoul (KR); Sang Yun Lee, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 10/475,345

(22) PCT Filed: Feb. 25, 2003

(86) PCT No.: PCT/KE03/00368

§ 371 (c)(1),
(2), (4) Date: Oct. 20, 2003

(87) PCT Pub. No.: WO03/071820

PCT Pub. Date: Aug. 28, 2003

(65) Prior Publication Data

US 2004/0132435 A1 Jul. 8, 2004

(30) Foreign Application Priority Data

Feb. 25, 2002 (KR) ................ 10-2002-0010006

(51) Int. Cl.
*H04Q 7/20* (2006.01)

(52) U.S. Cl. ............... 455/433; 455/414.2; 379/207.16
(58) Field of Classification Search .......... 379/207.16; 455/414.2, 433

See application file for complete search history.

(56) References Cited

U.S. PATENT DOCUMENTS 5,590,175 A * 12/1996 Gallant et al. .............. 455/433

(Continued)

FOREIGN PATENT DOCUMENTS

EP 1058442 12/2000

(Continued)

OTHER PUBLICATIONS

International Search Report for PCT/KR03/00368 issued Jun. 19, 2003.

*Primary Examiner*—George Eng
*Assistant Examiner*—Ariel Balaoing
(74) *Attorney, Agent, or Firm*—Mayer Brown Rowe & Maw LLP

(57) ABSTRACT

The present invention relates to method and apparatus for providing an arbitrary sound chosen by a called subscriber instead of ringback tone to a calling subscriber. In this present invention, if a call is received, a terminating exchanger requests a trunk connection to a sound db server based on the first information on whether or not to replace a ringback tone and the second information on a route to the sound db server that are received from a home location register (HLR), and provides a called subscriber identification for the sound server. Then, the sound db server searches its db for a sound specified by the called, and provides the found sound for the caller instead of a conventional ringback tone via the terminating exchanger connected through a trunk. Through this sequential procedure of network elements, a caller can hear a sound specified by a called instead of a dry ringback tone.

16 Claims, 6 Drawing Sheets

U.S. PATENT DOCUMENTS

| | | |
|---|---|---|
| 5,926,537 A | 7/1999 | Birze |
| 6,018,654 A * | 1/2000 | Valentine et al. ........ 455/414.4 |
| 6,427,076 B2 * | 7/2002 | Skog ........................... 455/433 |
| 6,574,335 B1 * | 6/2003 | Kalmanek et al. .......... 379/386 |
| 7,006,608 B2 | 2/2006 | Seelig et al. |
| 2004/0120494 A1 * | 6/2004 | Jiang et al. ............ 379/210.01 |
| 2005/0026646 A1 * | 2/2005 | Naim et al. .............. 455/552.1 |

FOREIGN PATENT DOCUMENTS

| | | |
|---|---|---|
| JP | 07-245772 | 9/1995 |
| JP | 2000-106685 | 4/2000 |
| JP | 2000-138960 | 5/2000 |
| JP | 2000-244964 | 9/2000 |
| KR | P2000-0000244 | 1/2000 |
| KR | 1020000055316 | 9/2000 |
| KR | 2001-0108937 | 12/2001 |
| WO | 00/39988 | 7/2000 |
| WO | WO 00/49793 * | 8/2000 |
| WO | WO 01/86931 A1 * | 11/2001 |

* cited by examiner

FIG. 6

| Parameter=CallingFeaturesIndicator2 | | | | | | | | Length=V | | Tag=H'9fff7d | |
|---|---|---|---|---|---|---|---|---|---|---|---|
| Contents | | | | | | | | | | meaning | |
| H | G | F | E | D | C | B | A | Octet | | Notes | |
| VMSB | | VMSU | | MC | | CC | | 1 | | | |
| FMSNA | | FMSB | | FMSU | | VMSNA | | 2 | | a | |
| SRBT | | NCW | | Prefer_Sys | | MUDN | | 3 | | | |
| ・・・・・・・・・・ | | | | | | | | n | | | |

*defined 'reserved' field before*

METHOD AND APPARATUS FOR PROVIDING SUBSCRIBER-BASED RINGBACK TONE

CROSS REFERENCE TO RELATED APPLICATION

This application is a 35 USC § 371 National Phase Entry Application from PCT/KR03/00368, filed Feb. 25, 2003, and designating the U.S.

1. TECHNICAL FIELD

The present invention relates to method and apparatus for providing an arbitrary sound chosen by a called subscriber for a calling subscriber instead of a conventional ringback tone.

2. BACKGROUND ART

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their individuality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional ringback tone still has the aforementioned drawbacks. That is, a caller can not identify a called before the called answers and the uniform ringback tone can not satisfy various subscribers' needs to reveal their individuality.

3. DISCLOSURE OF INVENTION

It is an object of the present invention to provide method and apparatus for providing an arbitrary sound chosen or registered by a called subscriber for a caller instead of a conventional RBT (RingBack Tone). In the present method and apparatus, an arbitrary RBT-replacing sound chosen or registered by a subscriber is stored in a server separated from mobile exchangers first, and if a certain subscriber is called, a terminating exchanger for the call receives from the server an RBT-replacing sound that is assigned to the called, and then provides the received sound for a caller instead of a conventional RBT.

A method of providing an arbitrary sound as an RBT in accordance with the present invention is characterized in that it comprises the steps of: an HLR's (Home Location Register's) furnishing a call-terminating exchanger with a first information on whether RBT is to be replaced or not and the second information informing a route to a sound providing means; the call-terminating exchanger's providing an RBT to a caller or requesting a trunk connection to the sound providing means while furnishing with information identifying a called, based on the first and the second information; and the sound providing means' determining an RBT-replacing sound based on the called-identifying information, and providing the determined RBT-replacing sound for the caller through the call-terminating exchanger the trunk connection is made to.

If the call-terminating exchanger detects that the call is answered while the determined RBT-replacing sound is being provided for the caller, it requests the sound providing means to release the established trunk connection to terminate transmission of the RBT-replacing sound.

The above-characterized method and apparatus provides a personal ad way by allowing a registered personal introducing or identifying sound to be used instead of an RBT. In addition, a caller is able to know by only hearing an RBT-replacing sound whether he or she called rightly. An enterprise as well as individual persons can advertise efficiently through registering an RBT-replacing sound.

4. BRIEF DESCRIPTION OF DRAWINGS

FIG. 1 is a simplified diagram of a mobile communication network which a subscriber-based RBT-replacing sound providing method is embedded in;

FIG. 6 shows format of the value-added service parameters including an RBT-replacing service field that are delivered from an HLR to a call-terminating exchanger.

5. MODES FOR CARRYING OUT THE INVENTION

In order that the invention may be fully understood, a preferred embodiment thereof will now be described with reference to the accompanying drawings.

Figure 1:
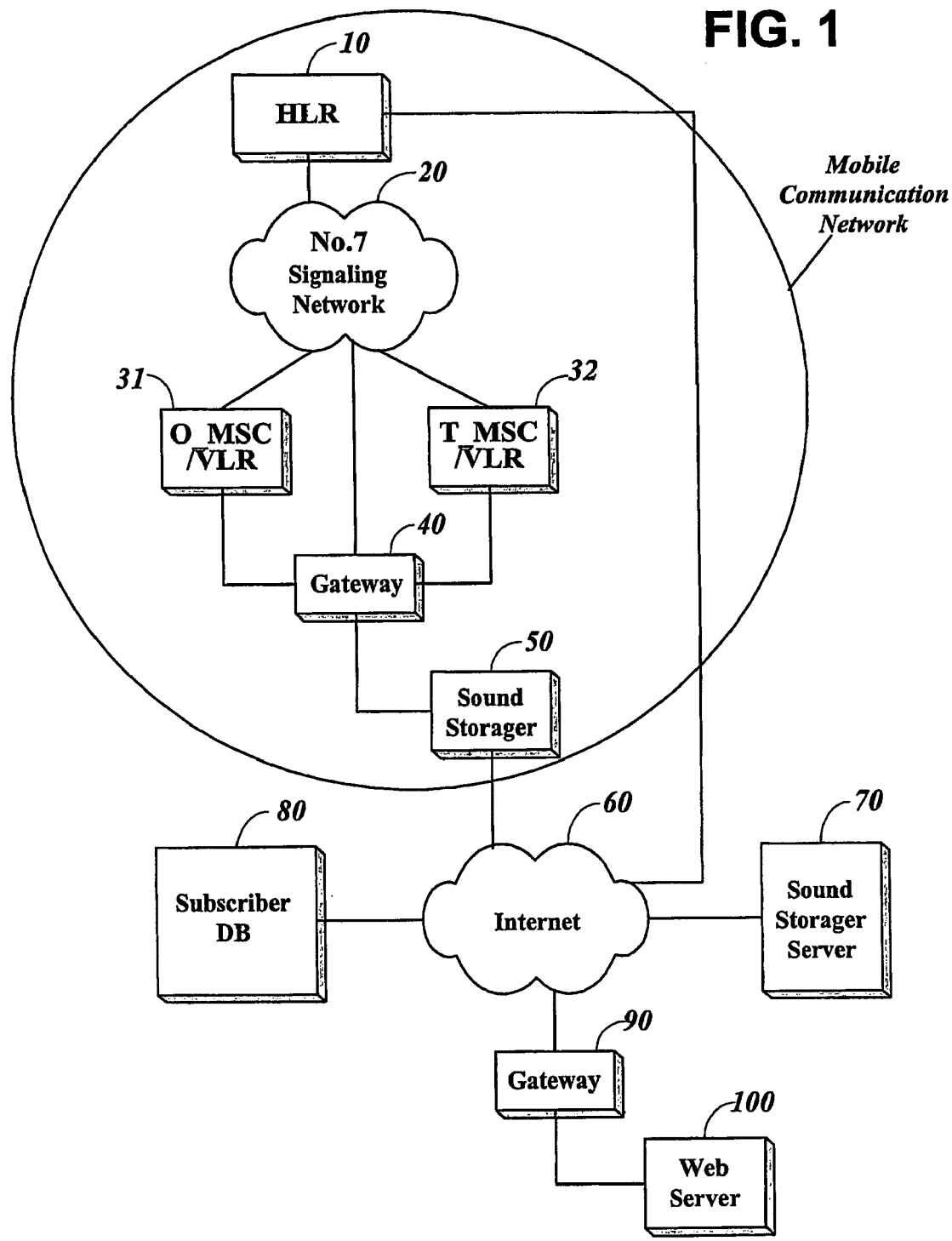

FIG. 1 is a simplified diagram of a mobile communication network which a subscriber-based RBT-replacing sound providing method is embedded in.

The network of FIG. 1 includes an HLR (Home Location Register) 10; mobile exchangers 31 and 32 (also called 'MSC' (Mobile Switching Center)) being capable of communicating with the HLR 10 via a No. 7 signaling network 20 based on No.7 signaling transfer protocol; a sound storager 50, connected to the No. 7 signaling network 20 via a gateway 40, storing RBT-replacing sounds and communicating with the exchangers 31 and 32; an SSS (Sound Storager Server) 70, connected to the sound storager 50 via Internet 60, controlling management of RBT-replacing sounds in the sound storager 70; a subscriber db 80 connected to the HLR 10 via Internet 60; and a web server 100, connected to Internet 60 via a gateway 90, communicating with the sound storager 50 and the SSS 70.

The HLR 10 functions as a conventional network element and it has in every subscriber profile the first information on whether RBT is to be replaced or not and the second information informing a route to the sound storager 50. The first and the second information are written in the value-added service parameters of each subscriber profile.

Either of the mobile exchangers 31 and 32 functioning as conventional network elements receives the first and the second information of a subscriber through communicating with the HLR 10 when the subscriber requests location registration. If the location-registered subscriber is called, the exchanger 31 or 32 receives an RBT-replacing sound from the sound storager 50 based on the received first and second information, and then provides a caller with the received RBT-replacing sound.

The sound storager 50 stores a plurality of digital sounds to be used for replacing an RBT. The stored digital sounds are provided for the exchangers 31 and 32 via the gateway 40.

The SSS 70 communicates with the sound storager 50 via Internet 60 and it chooses a digital sound based on information written in an RBT service table. A unique code to identify the chosen digital sound is notified the sound storager 50 in order that a stored sound identified by the code is sent to the exchanger 31 or 32 from the sound storager 50. The RBT service table used for choice of a digital sound allocated for each subscriber includes several codes linked to caller's personal information, caller or caller-group identifying information, and/or call time zone. Therefore, a digital sound can be chosen by the SSS 70 based on who calls, which group a caller belongs to, age, sex, or occupation of a caller, and/or when a subscriber is called.

Information in the RBT service table is determined when a person subscribes to the value-added service and is then modified by his or her request.

The web server 100, connected to the sound storager 50 and/or the SSS 70 via Internet 60, adds digital sounds to the sound storager 50 and conducts operations to update or change contents of the RBT service table and codes, if necessary, related digital sounds for the SSS 70. The updating or changing operation is initiated by subscriber's request through web pages of the web server 100.

The operation of the network of FIG. 1 is described below.

When a subscriber applies for subscription to the value-added service of RBT replacement, all information included in the application is stored in the subscriber db 80 that requests registration of RBT replacement service to the HLR 10. Then, the HLR 10 writes necessary information in value-added service parameters of that subscriber.

Afterwards, if location registration for that subscriber is requested from a serving exchanger 31 or 32, e.g., the exchanger 32 the HLR 10 provides service-related information and routing information for the exchanger 32 that requested location registration. The routing information is needed to make a trunk connection to the sound storager 50. The exchanger 32 registers the received information for that subscriber in a local subscriber db.

If an arbitrary subscriber at the exchanger 31 calls the location-registered subscriber, a trunk connection 'ISUP' is made between the originating 31 and the terminating exchanger 32 after routing information exchange through the HLR 10. After a trunk connection is setup, the terminating exchanger 32, knowing based on the registered information of the called subscriber that RBT replacement service is ON, makes another trunk connection to the sound storager 50 addressed by the registered information. At the same time, the terminating exchanger 32 provides the sound storager 50 with information of the called subscriber, e.g., mobile telephone number and starts to page the called.

The sound storager 50 inquires of the SSS 70 about which digital sound is set now for the called subscriber. Then, the SSS 70 informs the sound storager 50 of a code for digital sound having been chosen for a given condition by the called.

The sound storager 50 sends a digital sound identified by the received code to the originating exchanger 31 through the setup trunk connection between the two exchangers 31 and 32. The originating exchanger 31 transmits the digital sound from the sound storager 50 to the caller until the called answers the paging. Thus, the caller can hear the digital sound instead of a conventional RBT during the paging. The moment the called answers the paging, the terminating exchanger 32 releases the trunk connection established to the sound storager 50. The conversation between the caller and the called is communicated through the trunk connection made between the originating 31 and the terminating exchanger 32.

Figure 2:
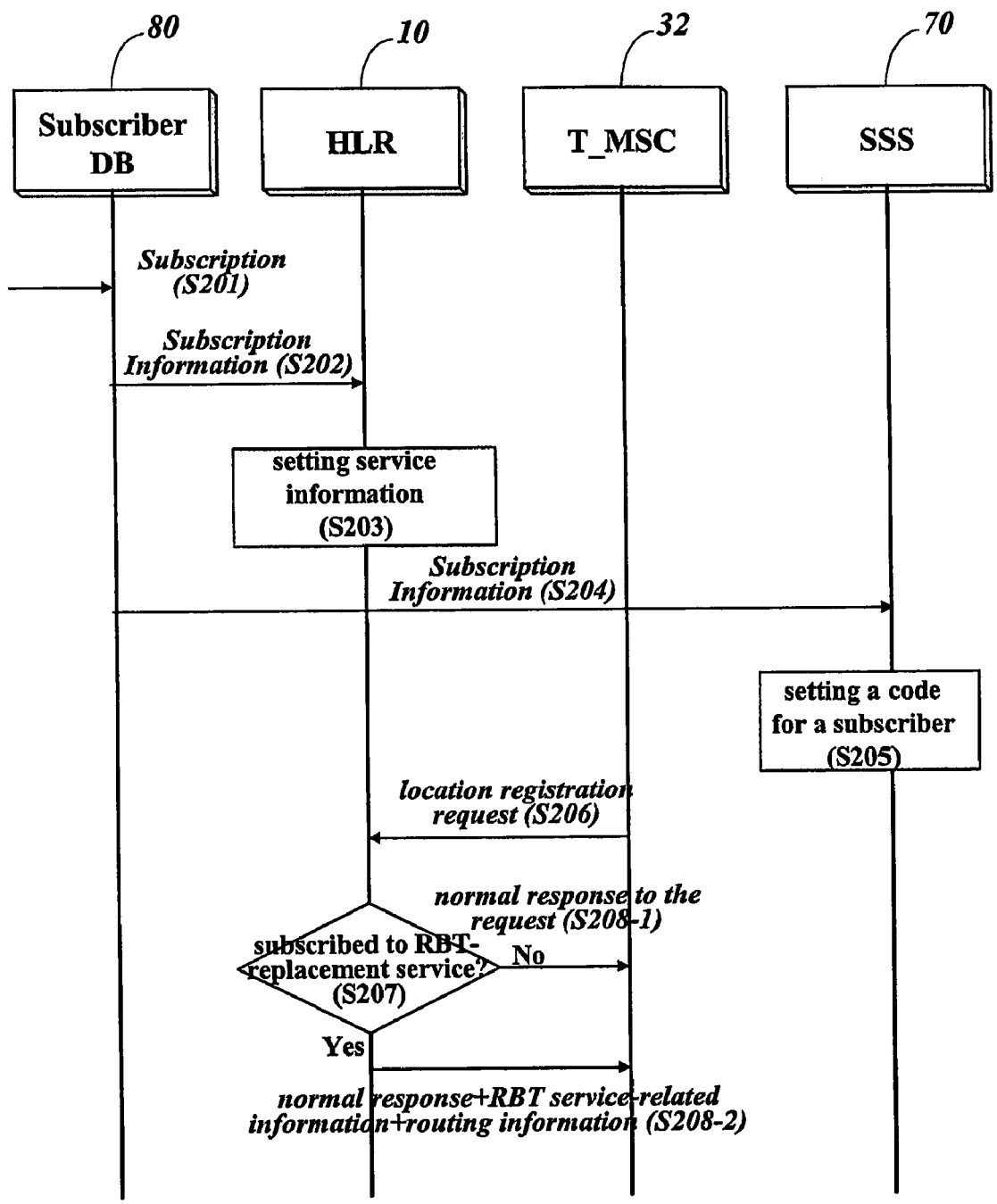
FIG. 2 is a procedure chart of an embodiment of the present invention to subscribe to a subscriber-based RBT-replacing sound providing service.

FIG. 2 is a procedure chart of an embodiment of the present invention to subscribe to a subscriber-based RBT-replacing sound providing service.

The procedure chart of FIG. 2 is explained below in parallel with the operation of the network of FIG. 1.

If subscription to the RBT-replacement service is asked (S201), subscription information including mobile telephone number of the subscriber is stored in the subscriber db 80 first and is then delivered to the HLR 10 (S202). The HLR 10 updates service information of the subscriber profile to indicate that the subscriber has subscribed to RBT replacement service (S203).

In addition, the subscriber db 80 also sends the subscription information including a chosen digital sound and mobile telephone number to the SSS 70 (S204). The SSS 70 writes a code associated with the chosen digital sound in an RBT service table allocated for that mobile telephone number (S205).

If the received subscription information includes particulars of sound assignments, namely if the received subscription information assigns different digital sounds for each caller, each caller group, and/or each time zone, the SSS 70 writes different codes of the respective digital sounds in each condition field of the RBT service table, at the step S205.

Afterwards, if location registration for the subscriber is requested from the exchanger 32 to the HLR 10 (S206), the HLR 10 checks profile of the subscriber to know whether the subscriber has been subscribed to the RBT replacement service (S207). If not subscribed, the HLR 10 sends a normal response message to the location registration request to the exchanger 32 as in the conventional request processing procedure (S208-1). However, if subscribed, the HLR 10 sends the exchanger 32 a response message including RBT service-related information and routing information, e.g., routing digits to direct to the sound storager 50. The exchanger 32 registers the received information in the subscriber's profile on a local db, e.g., a VLR (Visitor Location Register) (S208-2).

The RBT service-related information can be carried by an SRBT (Specific RBT) field, which was defined as a 'reserve' field before, of the value-added service parameters 'CallingFeaturesIndicator2' shown in FIG. 6. The 2-bit SRBT field is set to '10' in case that the RBT replacement service is not activated even though that service is valid by subscription, and it is set to '11' in case that the RBT replacement service is in active state. A message including the parameters 'CallingFeaturesIndicator2' responsive to the location registration request is delivered from the HLR 10 to the exchanger 32.

The service information parameters 'CallingFeaturesIndicator2' of FIG. 6 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

Figure 3:
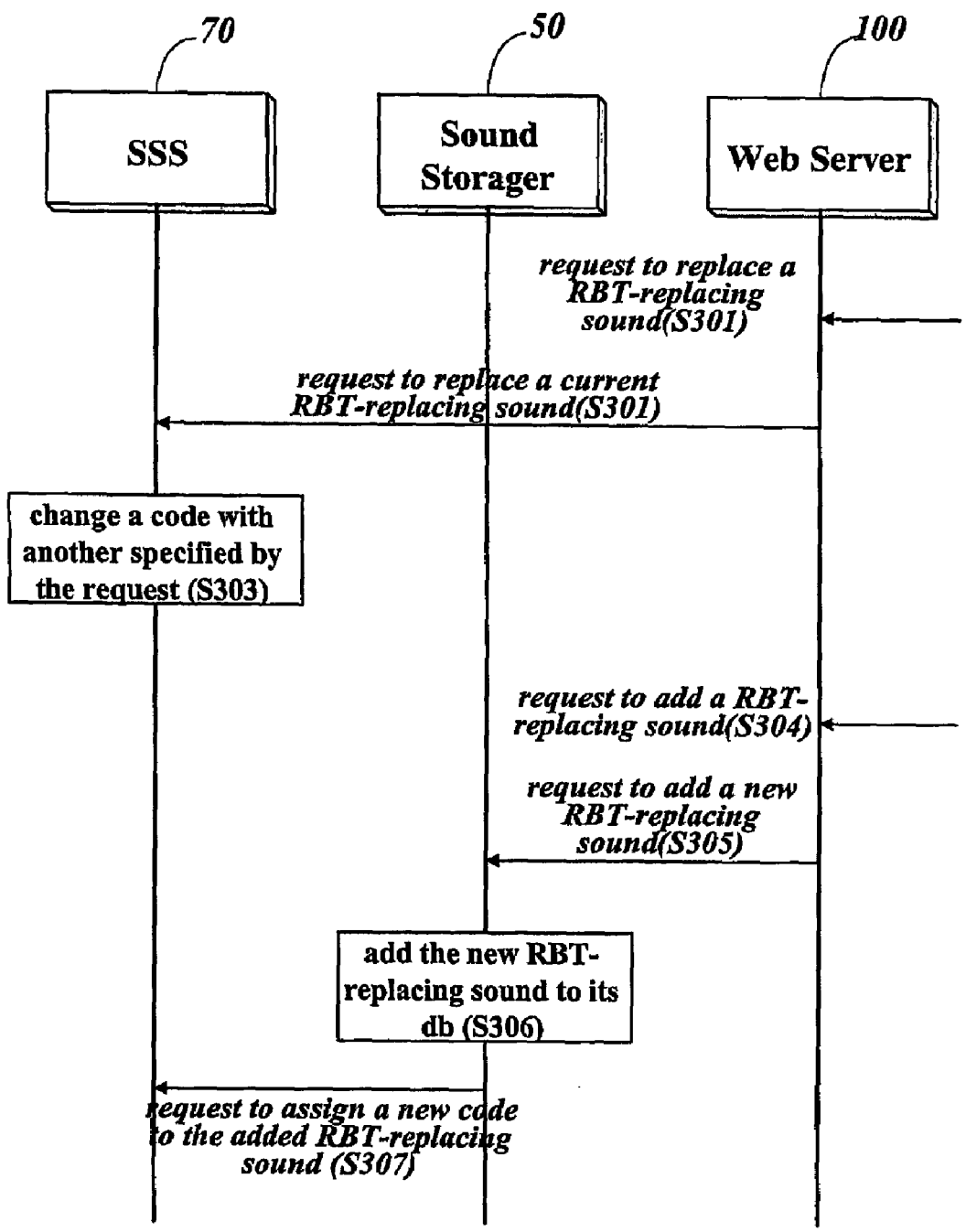
FIG. 3 is a procedure chart of another embodiment of the present invention to change/add subscription information related with an RBT-replacing sound providing service.

FIG. 3 is a procedure chart of another embodiment of the present invention to change/add subscription information related with RBT-replacing sound providing service.

A subscriber, who has subscribed to the RBT replacement service according to the above-explained procedure of FIG. 2, connects his or her personal computer to the web server 100, first. Then, the web server 100 provides web pages on the connected computer screen to enable the subscriber to change/add information about RBT replacement service.

The subscriber enters mobile telephone number through an adequate web page and then selects a desired RBT-replacing sound from a list showing all or a part of sounds stored in the sound storager 50. If the subscriber requests change of RBT-replacing sound to the chosen one (S301), the web server 100 sends a change-requesting message to the SSS 70 (S302). The SSS 70 changes the current code with another code assigned to the chosen RBT-replacing sound in an RBT service table allocated for the entered mobile telephone number (S303). Afterwards, an RBT-replacing sound identified by the changed code will be provided instead of a conventional RBT.

If the subscriber selects to add a new RBT-replacing sound on a web page, the SSS 70 provides an input web page. Then, the subscriber enters his or her mobile telephone number in the input web page and uploads a sound file including voice, sound logo, or music through the input web page (S304). The web server 100 requests the sound storager 50 to add a new RBT-replacing sound by delivering the inputted data to the sound storager 50 (S305). The sound storager 50 registers the uploaded sound file as a new RBT-replacing sound (S306) and requests the SSS 70 to assign a new code to the registered RBT-replacing sound (S307). The SSS 70 informs the sound storager 50 of the newly-assigned code and changes the current code with the newly-assigned code in an RBT service table allocated for the subscriber.

Figure 4:
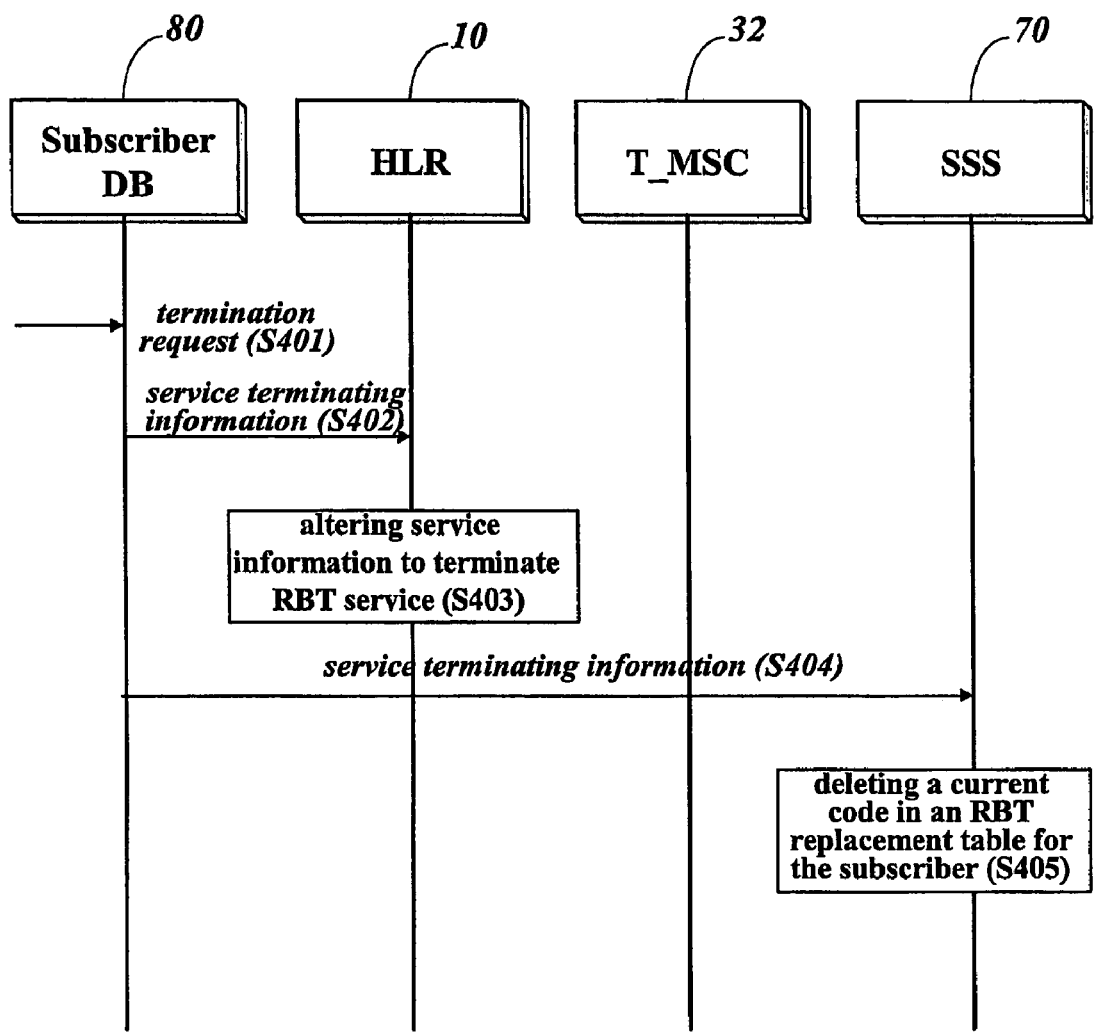
FIG. 4 is a procedure chart of another embodiment of the present invention to terminate a subscriber-based RBT-replacing sound providing service.

FIG. 4. is a procedure chart of another embodiment of the present invention to terminate a subscriber-based RBT-replacing sound providing service.

If termination of RBT replacement service is asked from a subscriber (S401), the subscriber db 80 deletes subscription information for RBT replacement service associated with the subscriber, namely, the subscriber's telephone number, and sends service terminating information including a mobile telephone number to the HLR 10 (S402). The HLR 10 alters service information of the subscriber's profile to indicate that the subscriber has not subscribed to RBT replacement service (S403).

The subscriber db 80 also sends the service terminating information to the SSS 70 (S404), then the SSS 70 deletes a current code in an RBT service table for the subscriber based on the received service terminating information (S405).

Figure 5:
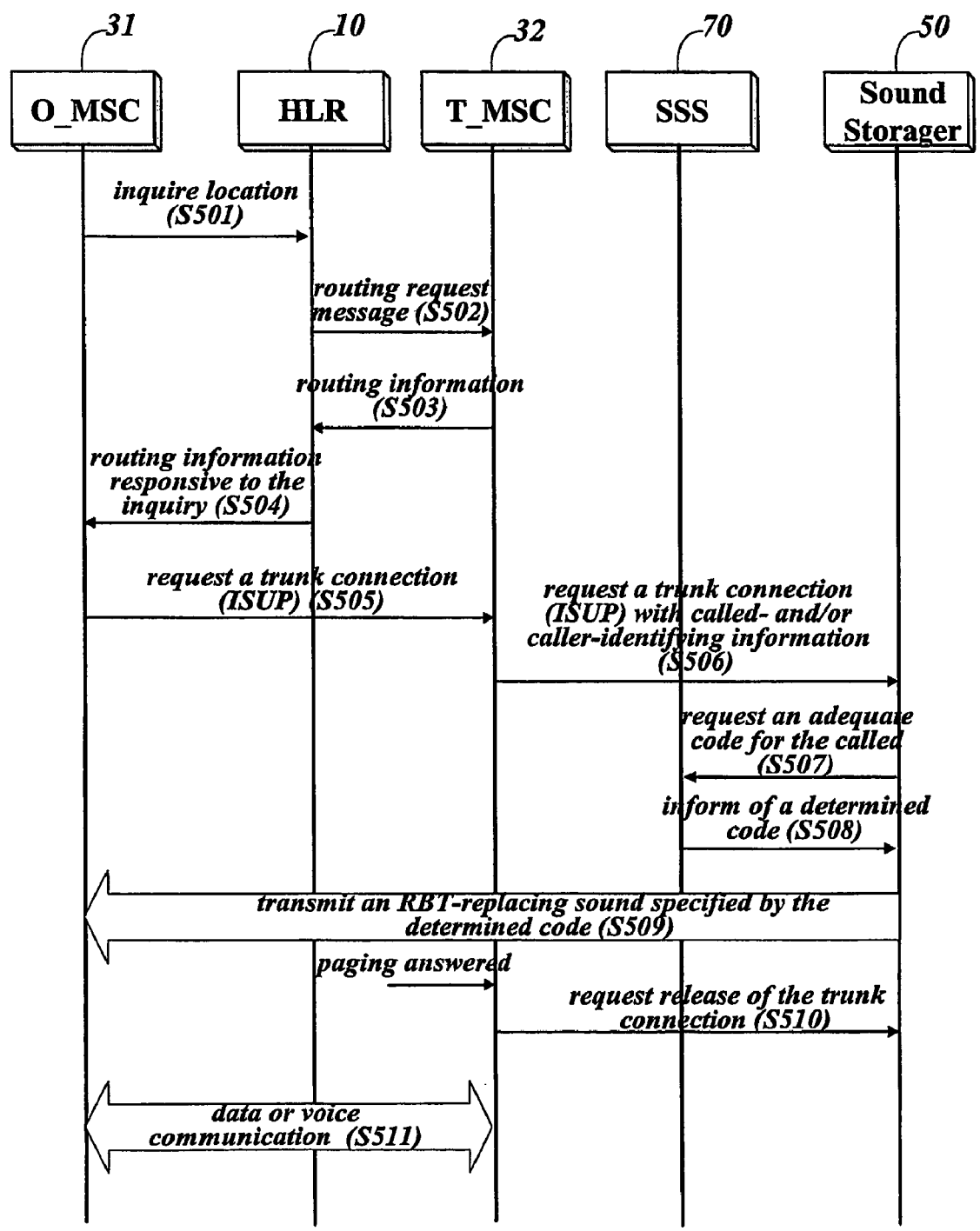
FIG. 5 is a procedure chart of another embodiment of the present invention to conduct a subscriber-based RBT-replacing sound providing service after completion of the procedure of FIG. 2 and/or 3.

FIG. 5 is a procedure chart of another embodiment of the present invention to conduct a subscriber-based RBT-replacing sound providing service after completion of the procedure of FIG. 2 and/or 3.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S501). Then, the HLR 10 sends a routing request message to the terminating exchanger 32 (S502), and the terminating exchanger 32 informs the HLR 10 of routing information, e.g., TLDN (Temporary Local Directory Number) in response to the routing request message (S503).

The HLR 10 delivers the routing information to the originating exchanger 31 in response to the inquiry step S501 (S504). The originating exchanger 31 requests the terminating exchange 32 based on the routing information to make a trunk connection therbetween (S505).

In the meantime, the terminating exchanger 32 checks the 'SRBT' field of the value-added service information of FIG. 6 that was registered for the called in its local db at the step S208-2 in the procedure of FIG. 2. If the two bits of the 'SRBT' field are '11' which means 'in-service' and 'activated', the terminating exchanger 32 makes a trunk connection to the sound storager 50 with reference to the routing information that was also received and stored at the step S208-2. At this time, mobile telephone numbers of the caller and the called are sent to the sound storager 50 (S506). While the above processes are conducted, a conventional RBT is not transmitted to the originating exchanger 31.

Now, respective trunk connections are made between the originating exchanger 31 and the terminating one 32 and between the terminating exchanger 32 and the sound storager 50.

The reason that the calling number is informed the sound storager 50 besides the called number is to make it possible to provide different RBT-replacing sound depending upon who the caller is or which group among groups classified by the called the caller belongs to.

The sound storager 50 asks an adequate code to the SSS 70 while providing the received numbers for the SSS 70 (S507). The SSS 70 examines an RBT service table allocated for the called number to determine a code matched with the calling number (if received), and informs the sound storager 50 of the determined code (S508) in response to the code-requesting step S507. The sound storager 50 transmits an RBT-replacing sound corresponding to the determined code to the caller through the trunk connections between the sound storager 50 and the terminating exchanger 32 and between the terminating exchanger 32 and the originating one 31 (S509).

When the SSS 70 determines an adequate code it may consider the present time. That is, the SSS 70 may determine a code associated with a time zone the present time belongs to for the called and the caller (if received). Considering the present time, different RBT-replacing sound can be provided if calling time is different.

If the called answers paging of the terminating exchanger 32 while the determined RBT-replacing sound is being transmitted instead of a conventional RBT, the terminating exchanger 32 requests the sound storager 50 to release the established trunk connection (S510). Then, voice or data are communicated between the caller and the called through the trunk connection between the originating 31 and the terminating exchanger 32 (S511).

In the present RBT-replacing sound providing service, a subscriber can access the HLR 10 to change the SRBT field of the value-added service parameters.

For instance, when a subscriber presses a special key on his or her mobile telephone the pressed key information is delivered to the HLR 10 which changes the 2-bit SRBT field based on the key information or alternately. However, more significant bit of the two can not be altered because it indicates whether or not subscribed to the RBT replacement service. Less significant bit can be altered by the above way because it indicates whether the RBT replacement service is activated or not.

Thus, in case of a person having subscribed to RBT replacement service, The SRBT field of the value-added service parameters for that person has a value of '10' or '11' only where the value '10' is indicative of 'inactive' of the service and '11' indicative of 'active'.

The special key commands change the 'SRBT' field from '10' to '11' or from '11' to '10'. Consequently, a subscriber can determine at will whether to use a conventional RBT or RBT-replacing sound he or she has chosen. If the 'SRBT' field is '10', a terminating exchanger transmits a conventional RBT to a caller even if a called has subscribed to the RET replacement service.

The invention claimed is:

1. A system for providing a replacement RBT (RingBack Tone) to a caller in a communication network, comprising:
an HLR (Home Location Register) for furnishing first information and second information, wherein the first information is whether an RBT is to be replaced with a replacement RBT or not and the second information is information on a route to a sound storager;
a call-terminating exchanger for receiving the first information and the second information and providing the RBT to a caller if the RBT is not to be replaced or requesting a trunk connection to the sound storager while furnishing the sound storager with the information identifying a called if the RBT is to be replaced with an RBT; and
a sound storage server for providing information to the sound storager that matches a replacement RBT to the information identifying the called;
wherein the sound storager determines which replacement RBT to provide based on the information identifying the called, and providing the replacement RBT to the caller through the call-terminating exchanger that the trunk connection is made to;
wherein the sound storager is located within the mobile communication network while the sound storager server is located outside of the mobile communications network;
wherein the first information is set based a special key information received from a mobile terminal of the called, and the first information is written in a reserve field allocated in value-added service parameters of a subscriber's profile; and
wherein the sound storager determines the RBT-replacing sound based on at least one of who the caller is, which group the caller belongs to among several groups classified by the called, and call time.

2. The system of claim 1, wherein the first and the second information are included in a response message to a location registration request message, the response message being sent from the HLR to the call-terminating exchanger.

3. The system of claim 1, wherein the call-terminating exchanger requests release of the trunk connection made to the sound storager when a call is answered by the called, and wherein the sound storager releases the trunk connection in response to the release request.

4. The system of claim 1, wherein the sound storager changes a current replacement RBT specified for the called with another replacement RBT by communicating with the sound storager server through communication with a web server operating based on internet protocol.

5. The system of claim 4, wherein the other sound is one already stored in the sound storager or received newly via the web server.

6. The system of claim 4, wherein, after being connected to the sound storager, the sound storager server changes the RBT-replacing sound based on subscriber identifying information entered through an input web page.

7. A system for providing a replacement RBT (RingBack Tone) to a caller in a communication network, comprising:
an HLR (Home Location Register) for furnishing first information and second information, wherein the first information is whether an RBT is to be replaced with a replacement RBT or not and the second information is information on a route to a sound storager;
a call-terminating exchanger for receiving the first information and the second information and providing the RBT to a caller if the RBT is not to be replaced or requesting a trunk connection to the sound storager while furnishing the sound storager with the information identifying a called if the RBT is to be replaced with an RBT; and
a sound storage server for providing information to the sound storager that matches a replacement RBT to the information identifying the called;
wherein the sound storager determines which replacement RBT to provide based on the information identifying the called, and providing the replacement RBT to the caller through the call-terminating exchanger that the trunk connection is made to;
wherein the sound storager is located within the mobile communication network while the sound storager server is located outside of the mobile communications network;
wherein the first information is set based a special key information received from a mobile terminal of the called, and the first information is written in a reserve field allocated in value-added service parameters of a subscriber's profile;
wherein the sound storager determines the RBT-replacing sound based on at least one of who the caller is, which group the caller belongs to among several groups classified by the called, and call time; and
wherein the sound storager changes a current replacement RBT specified for the called with another replacement RBT by communicating with the sound storager server through communication with a web server operating based on internet protocol and, after being connected to the sound storager, the sound storager server changes the RBT-replacing sound based on subscriber identifying information entered through an input web page.

8. The system of claim 7, wherein the first and the second information are included in a response message to a location registration request message, the response message being sent from the HLR to the call-terminating exchanger.

9. The system of claim 7, wherein the call-terminating exchanger requests release of the trunk connection made to the sound storager when a call is answered by the called, and wherein the sound storager releases the trunk connection in response to the release request.

10. The system of claim 7, wherein the other sound is one already stored in the sound storager or received newly via the web server.

11. A method for providing a replacement RBT (Ring-Back Tone) to a caller in a communication network, the method comprising:

furnishing, by an HLR (Home Location Register), first information and second information, wherein the first information is whether an RBT is to be replaced with a replacement RBT or not and the second information is information on a route to a sound storager;

receiving, by a call-terminating exchanger, the first information and the second information and providing the RBT to a caller if the RBT is not to be replaced or requesting a trunk connection to the sound storager while furnishing the sound storager with the information identifying a called if the RBT is to be replaced with an RBT; and providing, by a sound storage server, information to the sound storager that matches a replacement RBT to the information identifying the called;

wherein the sound storager determines which replacement RBT to provide based on the information identifying the called, and providing the replacement RBT to the caller through the call-terminating exchanger that the trunk connection is made to;

wherein the sound storager is located within the mobile communication network while the sound storager server is located outside of the mobile communications network;

wherein the first information is set based a special key information received from a mobile terminal of the called, and the first information is written in a reserve field allocated in value-added service parameters of a subscriber's profile; and wherein the sound storager determines the RBT-replacing sound based on at least one of who the caller is, which group the caller belongs to among several groups classified by the called, and call time.

12. The method of claim 11, wherein the first and the second information are included in a response message to a location registration request message, the response message being sent from the HLR to the call-terminating exchanger.

13. The method of claim 11, wherein the call-terminating exchanger requests release of the trunk connection made to the sound storager when a call is answered by the called, and wherein the sound storager releases the trunk connection in response to the release request.

14. The method of claim 1, wherein the sound storager changes a current replacement RBT specified for the called with another replacement RBT by communicating with the sound storager server through communication with a web server operating based on internet protocol.

15. The method of claim 14, wherein the other sound is one already stored in the sound storager or received newly via the web server.

16. The method of claim 14, wherein, after being connected to the sound storager, the sound storager server changes the RBT-replacing sound based on subscriber identifying information entered through an input web page.

* * * * *